United States Patent
Oudmayer

[11] Patent Number: 6,024,523
[45] Date of Patent: Feb. 15, 2000

[54] THREAD INSERT WITH FLOATING NUT

[75] Inventor: Willy Oudmayer, Chino, Calif.

[73] Assignee: Kaynar Technologies, Inc., Orange, Calif.

[21] Appl. No.: 09/100,793

[22] Filed: Jun. 19, 1998

Related U.S. Application Data

[60] Provisional application No. 60/050,555, Jun. 23, 1997.
[51] Int. Cl.[7] .............................. F16B 37/00; F16B 39/00
[52] U.S. Cl. ......................... 411/432; 411/111; 411/113; 411/178
[58] Field of Search .................................... 411/178, 111, 411/112, 113, 432

[56] References Cited

U.S. PATENT DOCUMENTS

| | | | |
|---|---|---|---|
| 2,986,188 | 5/1961 | Karp et al. | 411/113 |
| 3,039,508 | 6/1962 | Greene | 151/23 |
| 3,130,765 | 4/1964 | Neuschotz | 151/41.73 |
| 3,169,258 | 2/1965 | Neuschotz | 411/178 |
| 3,180,387 | 4/1965 | Dzus et al. | 411/111 |
| 3,233,645 | 2/1966 | Neuschotz | 151/23 |
| 3,270,792 | 9/1966 | Neuschotz et al. | 151/23 |
| 3,319,688 | 5/1967 | Rosan et al. | 151/23 |
| 3,342,096 | 9/1967 | Bobrowski | 411/432 |
| 3,346,031 | 10/1967 | Neuschotz | 151/23 |
| 3,371,697 | 3/1968 | James | 151/23 |
| 3,415,301 | 12/1968 | Neuschotz | 151/23 |
| 3,421,564 | 1/1969 | Neuschotz | 151/23 |
| 3,513,896 | 5/1970 | Neuschotz | 151/23 |
| 3,650,309 | 3/1972 | Neuschotz | 151/23 |
| 3,667,526 | 6/1972 | Neuschotz | 151/23 |
| 5,341,560 | 8/1994 | Junkers | 411/432 |

*Primary Examiner*—Victor N. Sakran
*Attorney, Agent, or Firm*—Lyon, P.C.

[57] ABSTRACT

A thread insert comprises an externally threaded housing with an internally threaded floating nut therein. Diametrically spaced ears on the nut are engaged in diametrically spaced grooves in the housing, respectively, to limit relative rotation between the nut and the housing yet permit radial movement of the nut relative to the housing. A single split ring locks the nut into the housing.

3 Claims, 1 Drawing Sheet

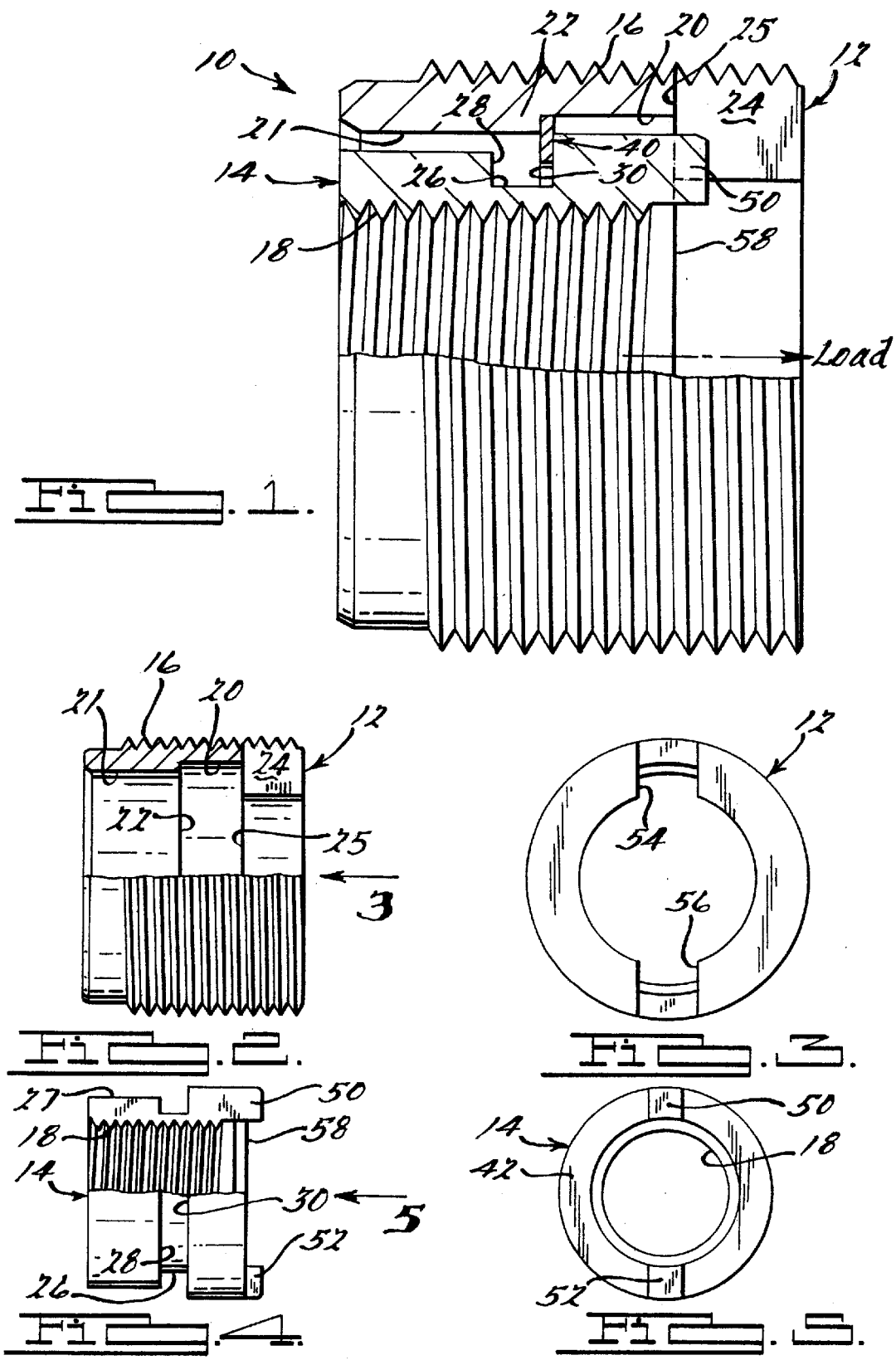

THREAD INSERT WITH FLOATING NUT

This application claims benefit of Provisional Application 60/050,555 filed Jun. 23, 1997.

This invention relates to an improved thread insert and, more particularly, to a thread insert having floating nut that facilitates assembly with an associated bolt.

BACKGROUND OF THE INVENTION

Thread inserts are often inserted in relatively soft or weak material to facilitate attachment of a fastener, for example a bolt, to said material. However, it is often difficult to position the thread insert so as to assure alignment with an opening in a part through which the bolt is to pass. While it is known to provide a floating nut in a thread insert to accommodate such misalignment, such known thread inserts have exhibited problems in the field.

Specifically, the torque resisting interface between the floating nut and the insert housing often distorts at maximum offset and bolt clamp-up. Moreover, the relatively small bearing surface of said interface between the floating nut and the insert housing of known floating nut thread inserts limits tensile load capability.

Yet another problem of known floating nut thread inserts is that when the multiple split retaining rings thereof are in the maximum offset condition, coupled with the splits therein being oriented in the same direction, the nut may not seat properly in the insert housing and can disengage under fully loaded conditions. In addition, manufacturing and assembly problems are present in known floating nut thread inserts. For example, both the nut and housing of most known thread inserts have milled or sheared surfaces which are difficult and costly to deburr. Moreover, multiple retaining rings of differing size must be installed in the correct sequence for proper retention.

SUMMARY OF THE INVENTION

The aforesaid problems are solved by the floating nut thread insert of the present invention. Specifically; (1) the torque resisting elements of the insert are located at the bolt entry side of the insert; (2) the torque resisting elements of the thread insert are not subjected to radial forces thereby eliminating the possibility of disengagement under torque-out loads; (3) the bearing surface of the floating nut on the insert housing is relatively large thereby maximizing tensile load capability; (4) the floating nut of the thread insert is of substantially cylindrical configuration so as to maximize flex for thread lock; (5) simplified design of all milled features reduces or eliminates deburring operations; (6) a single retaining ring is utilized, alleviating the need for critical assembly sequence and reducing costs by one item; and (7) the nut can no longer disengage due to misalignment of the retaining ring thereby increasing load capacity of the thread insert.

BRIEF DESCRIPTION OF THE DRAWINGS

FIG. 1 is an elevational view, partially in section, of an assembled thread insert having a floating nut in accordance with the invention;

FIG. 2 is an elevational view partially in section, of the insert housing.

FIG. 3 is a view taken in the direction of the arrow 3 of FIG. 2.

FIG. 4 is an elevation view, partially in section of the floating nut.

FIG. 5 is a view taken in the direction of the arrow 5 of FIG. 4.

Referring to FIG. 1 a thread insert 10 in accordance with a preferred constructed embodiment of the invention, comprises a housing 12 and a coaxially disposed floating nut 14. The housing 12 is of generally cylindrical configuration having external threads 16. The floating nut 14 is also of generally cylindrical configuration and is provided with internal threads 18.

The housing 12 has an annular recess 20 on a cylindrical radially inner wall 21 intermediate the axially spaced ends thereof defining a pair of radial shoulders 22 and 24. The shoulder 24 on the housing 12 extends radially inwardly relative to the cylindrical wall 21 thereof to define a load accepting seating surface 25 for the nut 14, as will be described.

As best seen in FIG. 4, the nut 14 has an annular recess 26 on a radially outer surface 27 thereof defining a pair of radial shoulders 28 and 30. As seen in FIG. 1, the shoulder 22 on the housing 12 in conjunction with the shoulder 30 on the nut 14 position a split ring 40 which, when in position, locks the nut 14 into the housing 12.

In accordance with one feature of the invention, a pair of torque resisting ears 50 and 52 on the nut 14 are accepted in complimentary slots 54 and 56 in the housing 12 in radially and axially slidable relationship. Thus, torque on the nut 14, in and of itself, does not result in radial or axial loading thereof or of the housing 12.

In accordance with another feature of the invention, axial load on the nut 14 is transferred to the shoulder 24 on the housing 12 by a radially extending end face 58 of the nut 14.

Assembly of the thread insert 10 is accomplished by assembling the split ring 40 into the annular recess 26 in the nut 14, radially compressing the split ring 40, and inserting the nut 14 and split ring 40 into the housing 12 from the left as seen in FIG. 1 of the drawing. The split ring 40 expands radially outwardly into the groove 20 in the housing 12 to lock the nut 14 into the housing 12. The thread insert 10 may then be screwed into a desired structure (not shown) in the conventional manner. When the thread insert 10 reaches the desired installed position, conventional keys (not shown) may be driven axially of the housing 12 to deform the threads 16 thereof and lock the thread insert 10 in position. A bolt (not shown) may then be screwed into the nut 14, from the right as seen in FIG. 1, during which assembly operation, the nut 14 is free to shift laterally relative to the housing 12 to effect self-alignment of the nut 14 with the bolt. It is to be noted that the ears 50 and 52 retain nut 14 against rotation relative to the housing 12 but are not required to transmit axially outward loads on the nut 14 to the housing 12.

While the preferred embodiment of the invention has been disclosed, it should be appreciated that the invention is susceptible of modifications without departing from the scope of the following claims.

What is claimed is:

1. A thread insert (10) comprising:
    an externally threaded right circular cylindrical housing (12) having a radially inwardly extending annular shoulder (24) at a bolt entry end thereof, said shoulder (24) defining a radially extending axially inwardly facing seating surface (25) and having a pair of diametrically spaced radially extending slots (54) and (56) therein, said housing (12) having a radially outwardly extending annular housing recess (20) on a radially inner wall (21) thereof adjacent the seating surface (25) defined by the shoulder (24); and a right circular cylindrical internally threaded floating nut 14 having an annular nut recess (26) on a radially outer surface (27) thereof intermediate the ends thereof and an annular radially outwardly extending flange 30 at a bolt accepting end thereof engageable with the seating surface (25) on the shoulder (24) of said housing (12) in load transfer relationship, said nut (14) having a pair of diametrically spaced ears (50) and (52) on the bolt accepting end thereof extending axially from the flange (30) thereon and engaged in the diametrically spaced slots (54) and (56) in the shoulder (24) of said housing (12), respectively, to limit relative rotation between said nut (14) and said housing (12); and a split ring (40) extending between the annular housing recess (20) in said housing (12) and the annular nut recess (20) in said nut (14) to lock said nut (14) within said housing (12) yet permit radial movement of said nut (14) relative to said housing (12).

2. A thread insert in accordance with claim 1 wherein the ears on the floating nut are movable relative to said housing so as to preclude radial loading thereof.

3. A thread insert in accordance with claim 1 wherein said housing and said nut have radially aligned opposite opening grooves, respectively; and a single split ring disposed in the grooves of said housing and nut to preclude disassembly thereof.

* * * * *